United States Patent [19]

Agro

[11] Patent Number: 5,574,600
[45] Date of Patent: Nov. 12, 1996

[54] LIGHT ASSEMBLY HAVING INTERCONNECTED HOUSING PARTS AND A LENS

[75] Inventor: James V. Agro, Geneva, Ill.

[73] Assignee: Cooper Industries, Inc., Houston, Tex.

[21] Appl. No.: 442,965

[22] Filed: May 17, 1995

[51] Int. Cl.$^6$ ........................................ G02B 7/02
[52] U.S. Cl. .......................... 359/818; 359/800; 359/813; 362/368
[58] Field of Search .................... 359/800, 799, 359/808, 809, 810, 818, 813, 819, 820, 823, 827; 362/362, 368, 370, 373

[56] References Cited

U.S. PATENT DOCUMENTS

| | | | |
|---|---|---|---|
| 2,521,558 | 9/1950 | Alvarez | 359/818 |
| 4,658,340 | 4/1987 | Bodensieck et al. | 362/362 |
| 4,762,395 | 8/1988 | Gordon et al. | 359/820 |
| 5,126,510 | 6/1992 | Bauer et al. | 362/362 |
| 5,142,466 | 8/1992 | Foster et al. | 362/368 |
| 5,249,082 | 9/1993 | Newman | 359/813 |

*Primary Examiner*—Loha Ben
*Attorney, Agent, or Firm*—Burns, Doane, Swecker & Mathis, L.L.P.

[57] ABSTRACT

A light assembly for a track lighting system includes a housing having releasable upper and lower parts. The lower housing part includes a shell and a baffle mounted in the shell. The baffle forms a light-emitting passage and defines a lens seat for receiving a lens that extends across the passage. The baffle carries spring clips which perform the dual function of non-releasably securing the baffle to the shell and retaining the lens on the lens seat.

22 Claims, 3 Drawing Sheets

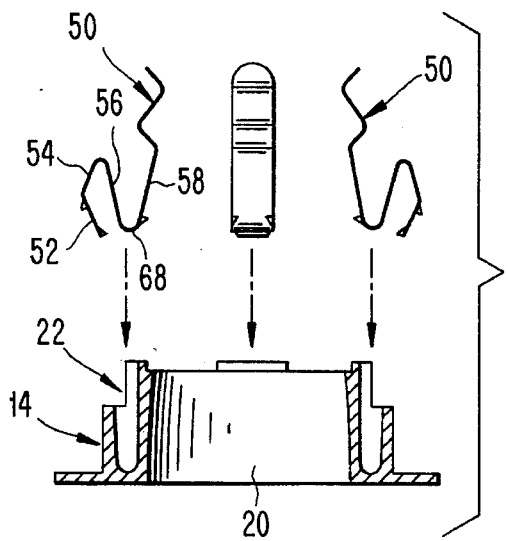
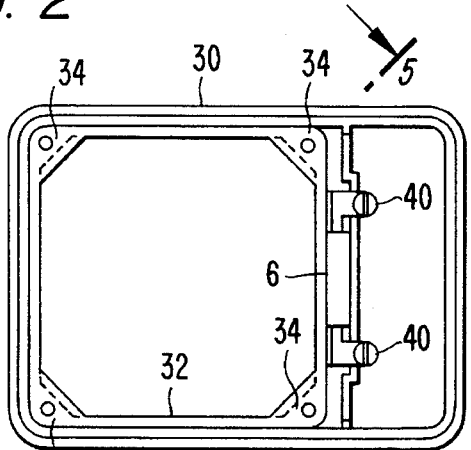
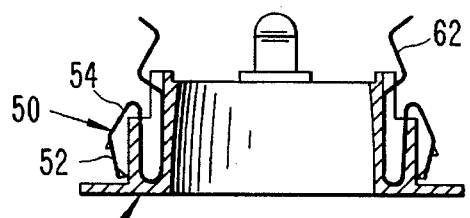
FIG. 2
FIG. 3
FIG. 4
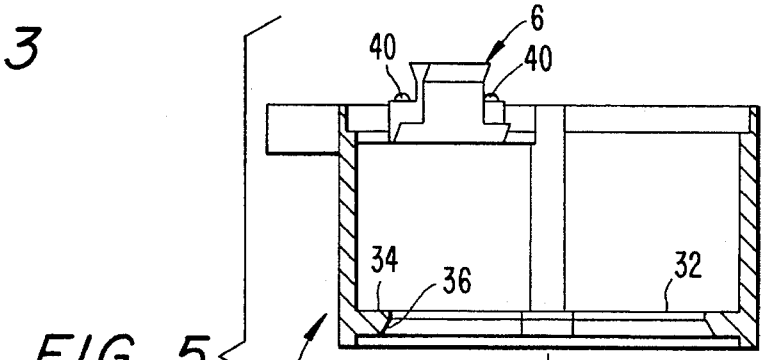
FIG. 5
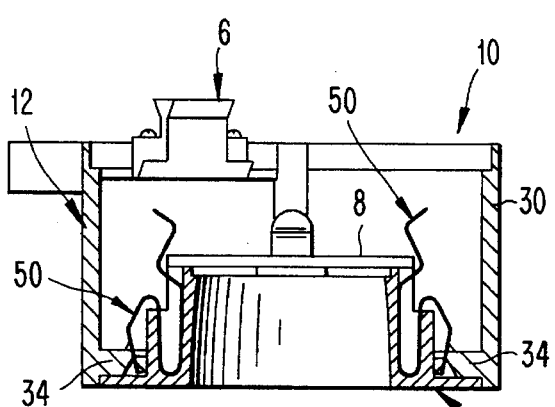
FIG. 6

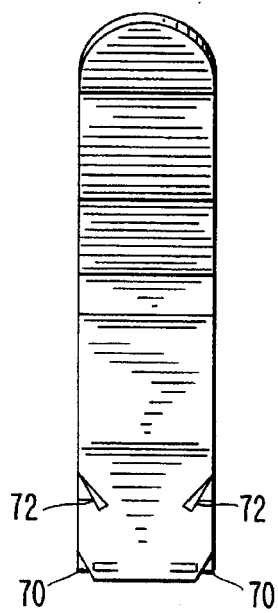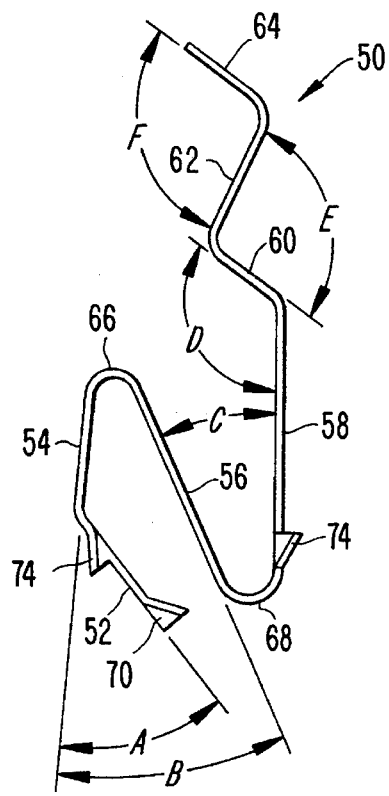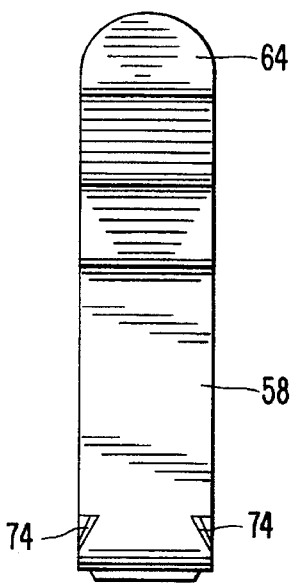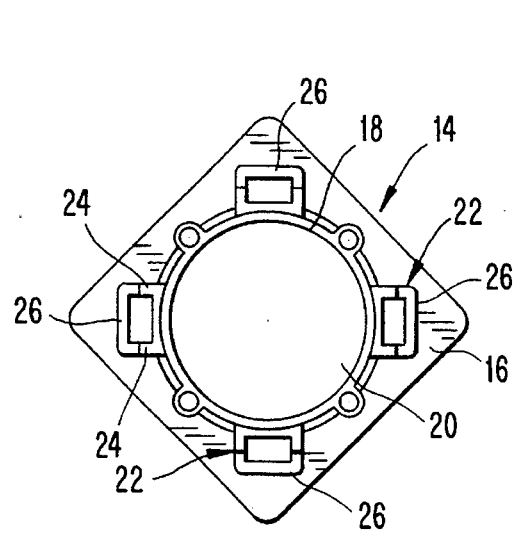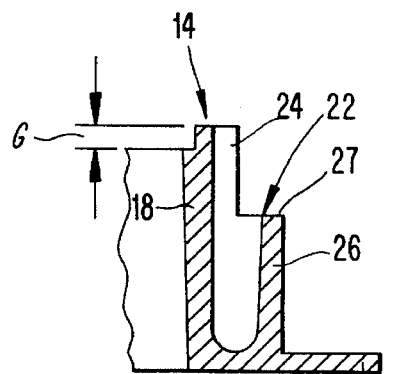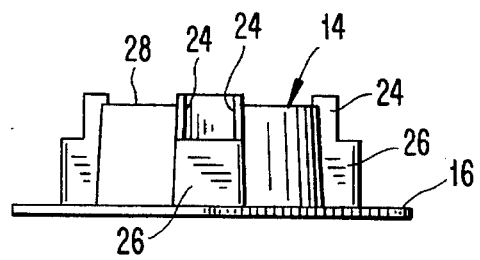

LIGHT ASSEMBLY HAVING INTERCONNECTED HOUSING PARTS AND A LENS

BACKGROUND OF THE INVENTION

The present invention relates to a lighting unit and in particular to a track lighting unit and to the interconnection of housing parts of the unit and the mounting of a lens within the unit.

A conventional track lighting unit depicted in FIG. 1 comprises an adapter 1 configured to be slidably inserted within a wall-mounted or ceiling-mounted track (not shown), a hollow post 2 extending downwardly from the adapter, and a housing 3 mounted at the lower end of the post. The housing 3 is rotatable relative to the post about a horizontal axis L, and the post 2 is rotatable relative to the adapter about a vertical axis L', in order to adjust the orientation of the housing 3.

The housing 3 comprises upper and lower parts 3U,3L that are releasably secured together. The upper part 3U includes a chamber in which is disposed a lamp-mounting device 4A for mounting a lamp 4 such as an MR-16 lamp. The wiring for the lamp extends through the post 2. A fixed plate 5 extends vertically in the chamber for receiving a spring clamp 6 attached to the lower housing part 3L in order to frictionally attach the two parts 3U,3L together.

Disposed in a casing of the lower housing part is a baffle 7 which includes a cylinder 7A forming a light-emitting passage 7B aligned with the lamp 4. A flat lens 8 (formed for example of glass) is disposed across the top of the cylinder 7A in alignment with the lamp 4 for achieving a desired optical effect. The lens is held in place by metal retaining springs 9. Each spring is secured to a boss 9A formed on the lower housing part by a screw 9B which also functions to attach the baffle to one of the bosses 9A.

It will be appreciated that the assembling of the lower housing part, baffle and retaining springs is cumbersome and time consuming, especially due to the need to attach the screws 9B in a confined area within the lower housing. Special tools are required to make such an attachment because of the confined area.

Therefore, it would be desirable to provide a light assembly which facilitates the mounting of the lens-carrying baffle.

SUMMARY OF THE INVENTION

One aspect of the present invention relates to a housing for a light assembly, comprising first and second housing parts releasably connected to one another. The first housing part forms an internal chamber, and includes a lamp-mounting device disposed in the chamber. The second housing part includes a shell removably mounted to the first housing part, a lens disposed in the shell in alignment with the lamp mounting device, and a baffle mounted to the shell and including a wall situated inside the shell to form a light-emitting passage. The wall forms a rim situated within the shell and defining a lens seat on which the lens is seated. A plurality of spring clips is provided, each spring clip engaging both the shell and the baffle for securing the baffle to the shell. Each spring clip also includes a lens-retaining portion for retaining the lens on the lens seat.

A portion of each spring clip is preferably wedged between the baffle and shell to form a non-releasable connection between the baffle and shell. Each spring clip preferably includes barbs engaging the baffle and shell, respectively, to resist movement of the spring clips relative to the baffle and shell.

The wall formed on the baffle preferably includes a plurality of pockets disposed around the passage, with the spring clips mounted in respective ones of the pockets.

Another aspect of the invention relates to the combination of the above-described housing with an adapter configured to be slidable in a track. The housing is mounted on the adapter and is movable relative thereto between various positions of adjustment.

A further aspect of the invention relates to a housing part per se which includes a shell, a lens, a baffle mounted to the shell and including a wall situated inside the shell to form a light-emitting passage. The wall forms a rim situated within the shell and defining a lens seat on which the lens is seated. Each of a plurality of spring clips engages both the shell and the baffle for securing the baffle to the shell. Each spring clip includes a lens-retaining portion for retaining the lens on the lens seat.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 2 is an exploded view of a baffle and spring clips according to the present invention, with the spring clips being in the process of being pushed into the baffle;

FIG. 3 is a view similar to FIG. 2 after the spring clips have been installed within the baffle;

FIG. 4 is a top plan view of a shell portion of a lower housing part according to the present invention;

FIG. 5 is an exploded vertical section of the baffle of FIG. 3 being installed into the shell of the lower housing part;

FIG. 6 is a view similar to FIG. 5 after the baffle has been installed within the shell;

FIG. 7 is a side view of a spring clip according to the present invention;

FIG. 8 is an edge view of the spring clip depicted in FIG. 7, the spring clip being in a relaxed condition;

FIG. 9 is another side view of the spring clip;

FIG. 10 is a top plan view of the baffle, in the absence of spring clips inserted therein;

FIG. 11 is a side elevational view of the baffle depicted in FIG. 10; and

FIG. 12 is a fragmentary sectional view taken through a pocket of the baffle depicted in FIG. 11.

DETAILED DESCRIPTION OF A PREFERRED EMBODIMENT OF THE INVENTION

Figure 1:
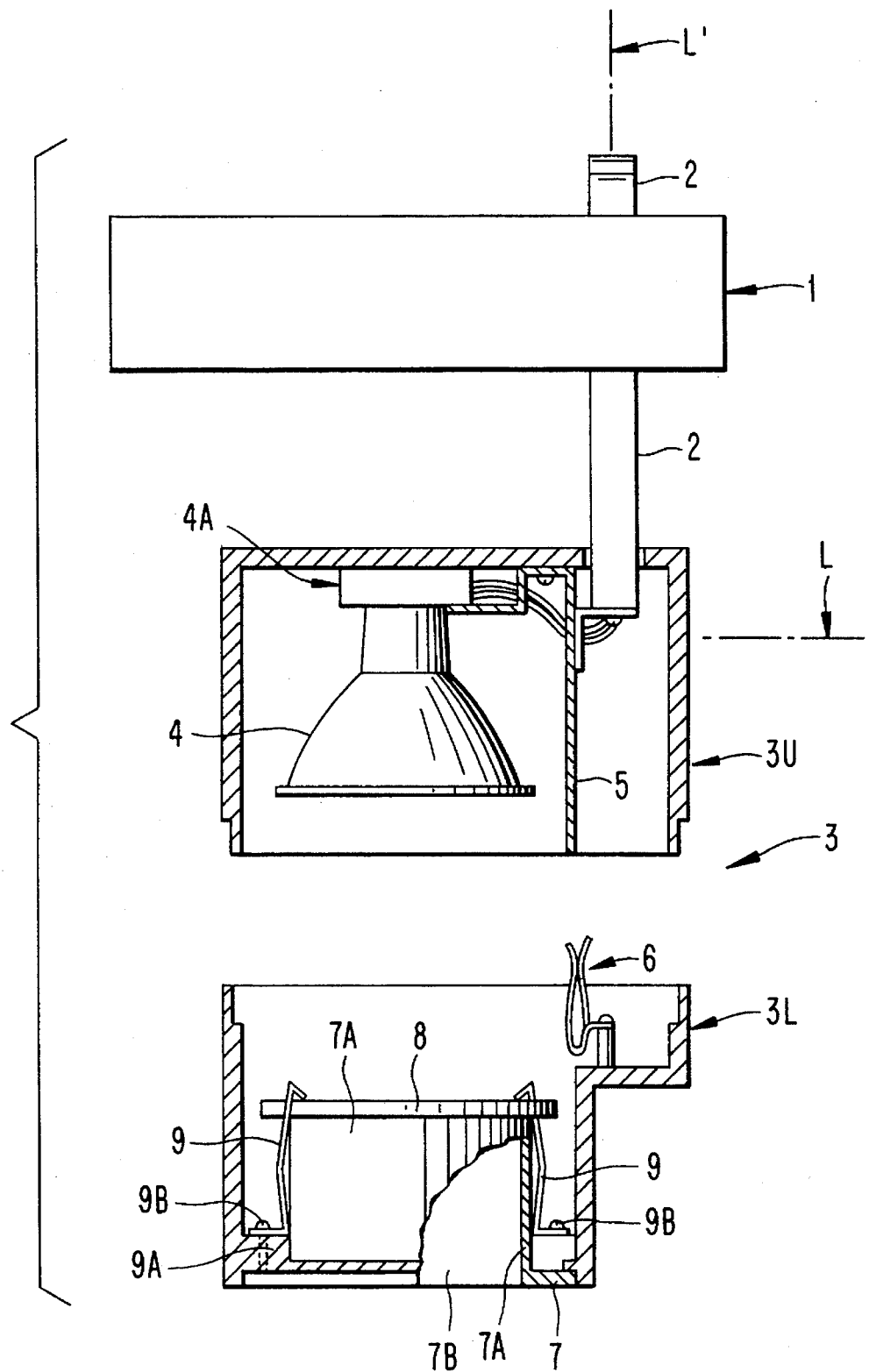
FIG. 1 is an exploded side elevational view of a prior art light assembly, with upper and lower housing parts thereof being shown in vertical section.

A track lighting assembly according to a preferred embodiment of the present invention comprises an adapter 1, a post 2, and an upper housing part 3U similar to those disclosed in connection with FIG. 1. However, the lower housing part 10 comprises a casing or shell 12 and a lens-supporting baffle 14 mounted in the shell without the need for screws.

The baffle 14, depicted in FIGS. 2, 3, 5, 6, and 10–12, is formed in one piece of a metallic material, e.g., aluminum. The baffle includes a rectangular base 16 from which projects a cylindrical center wall 18 that forms a center light-emitting passage 20 through the baffle 14.

Spaced circumferentially around the outer periphery of the wall 18 (e.g., spaced apart by ninety degrees) are pockets 22. Each pocket includes a pair of flanges 24 projecting radially outwardly from the wall 18 and extending parallel to the axis of the wall 18. A U-shaped enclosure wall 26 having an upper edge 27 interconnects the lower halves of each pair of flanges 24.

The flanges 24 project slightly higher than the rest of the upper edge 28 of the cylindrical wall 18 to form a gap G therebetween (see FIG. 12).

The shell 12 of the lower housing part includes a rectangular wall 30 forming a ledge 32 along a lower edge thereof (see FIG. 5). The ledge 32 includes four enlarged corner portions 34 disposed at respective corners of the ledge. Each of those corner portions includes a radially inwardly facing edge 36 which is beveled so as to face somewhat axially downwardly. A conventional spring clamp 6 similar to that depicted in FIG. 1 is attached to the shell 12 by screws 40. The spring clamp 6 enables the lower housing part 10 to be frictionally attached to the upper housing part 34 of FIG. 1.

In order to secure the baffle 14 within the shell 12, there are provided spring clips 50 each formed in one piece from a strip of metallic material, such as 25 gage annealed spring steel (see FIG. 8). The strip is bent into a series of sections, namely a first section 52, a second section 54, a third section 56, a fourth section 58, a fifth section 60, a sixth section 62, and a seventh section 64. The first section 52 forms an angle A of 45° with respect to the second section 54, and the third section 56 forms an angle B of 30° with respect to the second section 54. The second and third sections 54, 56 are interconnected by a first curved bight 66 which enables the first and second sections 54, 56 to flex elastically toward and away from one another. The third and fourth sections 56, 58 are interconnected by a second curved bight 68 to form a U-shaped structure, the third and fourth sections 56, 58 of which can flex elastically toward and away from one another to fit into a pocket 22 of the wall 18. Those third and fourth sections together form an angle C of 25°.

The fourth and fifth sections 58, 60 together form an angle D of 125°. The fifth and sixth sections 60, 62 together form an angle E of 100°. The sixth and seventh sections 62, 64 together form an angle F of 100°.

The first section 52 is cut and bent at two locations along each of its edges to form pairs of barbs 70, 72. Likewise, the fourth section 58 is cut and bent at one location along each of its edges to form a pair of barbs 74.

Each of the spring clips 50 is mounted within a respective pocket 22 of the baffle 14. That is, the third and fourth sections 56, 58 are pushed into the pocket 22 such that the first bight 68 is seated at the bottom of the pocket, and the adjacent first and second sections 52, 54 are situated outside of the pocket 22 as shown in FIGS. 2 and 3. The second bight 66 curves around an upper edge 27 of the wall 26. Upon being inserted into the pocket, the third and fourth sections 56, 58 become elastically compressed toward one another, and the barbs 74 of the fourth section are biased firmly against an inside surface of the pocket to resist removal of the spring clip 50 from its pocket.

After the spring clips 50 have been anchored in that manner, the sixth sections 62 of the spring clips 50 project above the cylinder 18 and converge upwardly away from a plane of the lens seat and toward the center axis of the passage 20, as shown in FIG. 3. The seventh sections 64 are inclined away from the plane of the lens seat and away from the center axis of the passage 20.

The baffle 14, together with the assembled spring clips 50, is then pushed as a unit into the shell 12 of the casing (see FIG. 5). As that occurs, the bevel 36 on the shell causes the first and second sections 52, 54 of each spring clip 50 to be elastically deformed such that the angle A temporarily becomes about zero. Once the barbs 72 travel past the upper surface of the ledge 32, the first and second sections 52, 54 rebound outwardly to their mutually angled relationship, whereupon the sections 52 become wedged between the baffle 14 and the shell 12, and the barbs 72 form an interference fit with the ledge 32. There is thus provided a non-releasable connection preventing the baffle 14 from being separated from the shell 12. Also, the barbs 70 of the first section 52 become pressed firmly against an outside surface of the wall 26 to further prevent separation of the spring clips from the baffle 14.

A lens 8 (formed for example of glass or plastic) can then be installed by being pressed downwardly against the seventh (upper) sections 64 of the spring clips. Since those sections 64 diverge upwardly away from one another, they will be cammed radially outwardly away from one another, enabling the lens 8 to snap into a space formed between the sixth sections 62 and be retained thereby. Lenses of varying thicknesses can be retained in that manner.

It will also be appreciated that more than one lens can be mounted simultaneously in the space formed by the sixth sections 62, in order to achieve a desired optical effect.

The lens 8 becomes seated on a lens seat defined by upper edges of the flanges 24 of the wall 18. Thus, the gaps G are maintained between the lens 8 and recessed portions of the wall 18 to form heat escape routes which minimize heat build-up within the chamber during operation of the light.

Once the lower housing part 10 has been assembled in that manner (see FIG. 6), it can be attached to the upper housing part 3U (see FIG. 1) in the usual manner, i.e., by pressing the spring clamp 6 onto the plate 5 of the upper housing part 3U.

It will be appreciated that the baffle 14 and spring clips 50 can be assembled together outside of the shell 12, and then the baffle 14 and spring clips 50 can be installed as a unit into the shell by being pushed thereinto. Hence, there is no need to attempt to attach any screws in a confined area in order to assemble the lower housing part. This reduces the difficulty and time required for assembly.

The spring clips perform the dual function of non-releasably securing the baffle to the shell, and retaining the lens on the lens seat.

The lens can be easily snapped into position. Also, lenses of different thicknesses and/or multiple lenses can be retained by the spring clips to enable different optical effects to be achieved.

The gaps G formed between the lens and the cylindrical wall 18 provide for the escape of heat to minimize heat build-up within the chamber of the housing.

It will be appreciated that the lower housing part 10 according to the present invention is usable as a replacement for the lower housing parts 3L of existing light assemblies.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A housing for a light assembly, comprising first and second housing parts releasably connected to one another, said first housing part forming an internal chamber, and including a lamp-mounting device disposed in said chamber; said second housing part including:
a shell removably mounted to said first housing part,
a lens disposed in said shell in alignment with said lamp-mounting device,
a baffle mounted to said shell and including a wall situated inside said shell to form a light-emitting passage, said wall forming a rim situated within said shell and defining a lens seat on which said lens is seated, and
a plurality of spring clips, each spring clip engaging both said shell and said baffle and applying forces to both said shell and said baffle for securing said baffle to said shell, and each spring clip including a lens-retaining portion for retaining said lens on said lens seat.

2. The housing according to claim 1, wherein a portion of each spring clip is wedged between said baffle and said shell to form a non-releasable connection between said baffle and shell.

3. The assembly according to claim 2, wherein each spring clip includes barbs engaging said baffle and said shell, respectively, to resist movement of said spring clips relative to said baffle and said shell.

4. The housing according to claim 1, wherein said wall includes a plurality of pockets disposed around said passage, said spring clips mounted in respective pockets.

5. The housing according to claim 4, wherein each pocket includes first and second mutually facing surfaces, each spring clip including a pair of sections arranged to form a U-shape insertable into a respective pocket such that said sections engage respective ones of said first and second surfaces.

6. The housing according to claim 5, wherein each spring clip includes a portion extending from one of said sections and wedged between said baffle and said shell.

7. The housing according to claim 6, wherein each spring clip includes another portion extending from the other of said sections for retaining said lens.

8. The housing according to claim 1, wherein portions of said rim are spaced from said lens seat to define a heat-conducting gap.

9. The housing according to claim 1, wherein said lens-retaining portions of said spring clips are inclined away from a plane of said lens seat and toward a center axis of said light emitting passage.

10. A light assembly for track lighting, comprising:
an adapter configured to be slidable in a track; and
a housing mounted on said adapter and movable relative to said adapter between various positions of adjustment, said housing including a first part connected to said adapter and a second part removably connected to said first part,
said first part forming an internal chamber, and including a lamp-mounting device disposed in said chamber,
said second housing part including:
a shell removably mounted to said first housing part,
a lens disposed in said shell in alignment with said lamp-mounting device,
a baffle mounted to said shell and including a wall situated inside said shell and extending toward said first housing part for forming a light-emitting passage aligned with said lamp-mounting device, said wall forming a rim facing said lamp-mounting device and defining a lens seat on which said lens is seated, and
a plurality of spring clips, each spring clip engaging both said shell and said baffle and applying forces to both said shell and said baffle for attaching said baffle to said shell, and each spring clip including a lens-retaining portion for retaining said lens on said lens seat.

11. The assembly according to claim 10, wherein a portion of each of said spring clips is wedged between said baffle and said shell to form a non-releasable connection between said baffle and said shell.

12. The assembly according to claim 11, wherein each of said spring clips includes barbs engaging said baffle and said shell, respectively, to resist movement of said spring clips relative to said baffle and said shell.

13. The assembly according to claim 10, wherein said wall includes a plurality of pockets disposed around said passage, said spring clips mounted in respective ones of said pockets.

14. The assembly according to claim 13, wherein each pocket includes first and second mutually facing surfaces, each spring clip including a pair of sections arranged to form a U-shape insertable into a respective pocket such that said sections engage respective ones of said first and second surfaces.

15. The assembly according to claim 14, wherein each spring clip includes a portion extending from one of said sections and wedged between said baffle and said shell.

16. The assembly according to claim 15, wherein each spring clip includes another portion extending from the other of said sections for retaining said lens.

17. The assembly according to claim 10, wherein portions of said rim are spaced from said lens seat to define a heat conducting gap.

18. The assembly according to claim 10, wherein said lens retaining portions of said spring clips are inclined away from a plane of said lens seat and toward a center axis of said light emitting passage.

19. The assembly according to claim 18, wherein said spring clips include free ends joined to said lens retaining portions and extending away from said plane and away from said center axis.

20. A housing part for a light assembly, comprising:
a shell,
a lens disposed in said shell,
a baffle mounted to said shell and including a wall situated inside said shell to form a light-emitting passage, said wall forming a rim situated within said shell and defining a lens seat on which said lens is seated, and
a plurality of spring clips, each spring clip engaging both said shell and said baffle and applying forces to both said shell and said baffle for securing said baffle to said shell, and each spring clip including a lens-retaining portion for retaining said lens on said lens seat.

21. The housing according to claim 20, wherein a portion of each spring clip is wedged between said baffle and said shell to form a non-releasable connection between said baffle and said shell.

22. The assembly according to claim 21, wherein each spring clip includes barbs engaging said baffle and said shell, respectively, to resist movement of said spring clips relative to said baffle and said shell.

* * * * *